(12) United States Patent
Greene

(10) Patent No.: US 10,926,822 B1
(45) Date of Patent: Feb. 23, 2021

(54) BICYCLE TRAINING AID DEVICE

(71) Applicant: Shaun Greene, Plantation, FL (US)

(72) Inventor: Shaun Greene, Plantation, FL (US)

( * ) Notice: Subject to any disclaimer, the term of this patent is extended or adjusted under 35 U.S.C. 154(b) by 0 days.

(21) Appl. No.: 16/719,961

(22) Filed: Dec. 18, 2019

(51) Int. Cl.
*B62H 7/00* (2006.01)
*B62K 3/06* (2006.01)

(52) U.S. Cl.
CPC ............... *B62H 7/00* (2013.01); *B62K 3/06* (2013.01); *B62K 2206/00* (2013.01)

(58) Field of Classification Search
CPC ......... B62H 7/00; B62K 3/06; B62K 2206/00
USPC ...................................................... 280/304.5
See application file for complete search history.

(56) References Cited

U.S. PATENT DOCUMENTS

| | | | |
|---|---|---|---|
| 1,371,100 A * | 3/1921 | Larsen | B62D 49/04 |
| | | | 280/476.1 |
| 3,650,544 A | 3/1972 | Cassell | |
| 5,154,096 A | 10/1992 | Geller et al. | |
| 5,259,638 A | 11/1993 | Krauss et al. | |
| 5,558,348 A * | 9/1996 | Becka | B62H 7/00 |
| | | | 280/282 |
| 5,577,750 A | 11/1996 | Sklar | |
| 5,915,711 A | 6/1999 | Seiple | |
| 5,988,663 A | 11/1999 | Starks | |
| D422,947 S * | 4/2000 | Brathwaite | D12/114 |
| 6,120,050 A | 9/2000 | Tillim | |
| 6,349,958 B1 | 2/2002 | Gawlik | |
| 6,398,248 B1 | 6/2002 | Dodson | |
| 6,431,422 B1 * | 8/2002 | Moore | B62J 1/16 |
| | | | 224/427 |
| 6,488,302 B2 | 12/2002 | Coates | |
| 6,712,376 B2 | 3/2004 | Eberhardt et al. | |
| 6,769,708 B2 | 8/2004 | Ackerly | |
| 6,918,606 B2 | 7/2005 | Petrishe | |
| 9,051,016 B2 * | 6/2015 | Boger | B62H 7/00 |
| 2012/0139200 A1 * | 6/2012 | Plesh | B62B 1/12 |
| | | | 280/47.18 |
| 2012/0280471 A1 * | 11/2012 | Schexnayder | B62H 7/00 |
| | | | 280/304 |
| 2018/0050748 A1 | 2/2018 | Faust | |

* cited by examiner

*Primary Examiner* — Jacob D Knutson
*Assistant Examiner* — Felicia L. Brittman
(74) *Attorney, Agent, or Firm* — Mark C. Johnson; Johnson Dalal

(57) ABSTRACT

A bicycle training aid device comprising a cantilevered handle member extending outwardly away from the bicycle and disposed laterally adjacent to the rear wheel using at least two clamping members. The clamping members may compress and extend to accommodate a range of different bicycles and to thereafter lock into place using at least two locking pins. The bicycle training aid device allows a second person, generally positioned to the rider's side or rear, to hold the bicycle steady by maneuvering the cantilevered handle member, thereby helping the person riding the bicycle maintain the proper balance needed for a smooth and continuous ride. In this way, the bicycle training aid also grants the second person a more effortless and accessible point of contact during use.

20 Claims, 5 Drawing Sheets

BICYCLE TRAINING AID DEVICE

FIELD OF THE INVENTION

The present invention relates generally to devices employed to train a person how to ride a bicycle without training wheels and, more particularly, relates to a bicycle training aid device intended to help the driver of the bicycle maintain proper balance to facilitate smooth and successful operation of the bicycle.

BACKGROUND OF THE INVENTION

Learning how to ride a bicycle often requires the assistance of an additional device, assembly, or method to expedite and facilitate the learning process. Oftentimes, such assistance comes in the form of a second person, generally positioned to the rider's side or rear, in holding the bicycle steady so as to maintain the proper balance needed for a smooth and continuous ride. As such, there are known devices in the marketplace which generally come in the shape of an extended pole, tube, or member attached to any one of a variety of parts of a bicycle. These known devices are designed to be attached to the bicycle at one end and to be selectively held and guided by the assisting individual at the other end. Current methods, however, fail to sufficiently adapt to diversely configured bicycles comprising various shapes, forms, and sizes. Further, many of these known devices fail to provide efficient handling and maneuvering of the bicycle, which is the ultimate purpose of such training aid devices. Many current training aid devices and assemblies are also not operably configured in such a way as to allow the extended pole, tube, or member to quickly and smoothly detach from the bicycle while in motion, forcing riders to continue riding with the device protruding outward from the bicycle which impedes on the balance of the rider and bicycle. Other devices do not provide the leverage granted to the trainee this device provides to properly support and maintain the balance of the bicycle and its driver—the same leverage afforded by a wrench and/or pliers to tighten or loosen a bolt.

Therefore, a need exists to overcome the problems with the prior art as discussed above.

SUMMARY OF THE INVENTION

The invention provides a bicycle training aid device that overcomes the hereinafore-mentioned disadvantages of the heretofore-known devices and methods of this general type and that provides for efficient handling and maneuvering of a bicycle when used to teach and train riders how to ride a bicycle.

With the foregoing and other objects in view, there is provided, in accordance with the improvement and in combination with a bicycle, an improvement comprising a cantilevered handle member with a first free end, a second end opposing the first free end, and handle member length separating the first free end and the second end, the cantilevered handle member disposed laterally adjacent to and extending in a direction outwardly away from the rear wheel, terminating at the first free end disposed above the rear wheel, and defining a plurality of throughholes. The cantilevered handle member, at the second end, comprises a handle bracket member with two clamping members, each with an upper clamping member and a lower clamping member defining a retention channel with at least one of the two frame members disposed therein, the upper and lower clamping members operably configured to selectively compress and expand with respect to one another to decrease and increase a diameter of the retention channel, respectively.

In accordance with a further feature of the present improvement, the second end further comprises a first pin and a second pin. Each pin comprises a head portion and a cantilevered and elongated pin portion extending from the head portion of the pin and spanning through one of the plurality of throughholes defined by the cantilevered handle member, the cantilevered and elongated pin portion of the pin having a locking aperture defined thereon and with a locking pin disposed within the locking aperture and each of the two clamping members rotatably coupled to the head portion of each pin.

In accordance with another feature, an embodiment of the present improvement includes a gripping member disposed proximal to the first free end and of an elastically resilient material.

In accordance with a further feature of the present improvement, the locking apertures defined by the first and second pins, respectively, are of an enclosed slotted channel.

In accordance with yet another feature of the present improvement, the two clamping members each further comprise a unitary body with the upper and lower clamping members defining a U-shaped retention channel and an entrance opening spatially coupled to the U-shaped retention channel, the unitary body having a strap with a free end operably configured to directly couple with at least one of the upper and lower clamping members and cause selective compression and expansion of the upper and lower clamping members with respect to one another.

In accordance with another feature, an embodiment of the present improvement also includes an upper clamping member comprising a plurality of teeth disposed on an upper surface, opposing an inner surface on the upper clamping member partially defining the retention channel, of the upper clamping member, the plurality of teeth defining a plurality of slots in shaped and sized to receive a portion of the strap.

In accordance with yet another feature, an embodiment of the present improvement includes a handle bracket with an upper end, a lower end opposing the upper end of the handle bracket, a bracket length separating the upper and lower ends of the handle bracket, an outer surface coupled to the two clamping members and with an inner surface opposing the outer surface and defining a handle placement channel shaped and sized to receive the second end of the cantilevered handle member and a portion of the handle member length spanning from the second end and toward the first free end, the handle placement channel with the cantilevered handle member disposed therein.

In accordance with a further feature of the present improvement, the handle bracket comprises at least one recessed channel defined by the inner surface of the handle bracket and spanning in a direction along the bracket length and from the upper end of the handle bracket toward the lower end of the handle bracket, the at least one recessed channel shaped and sized to receive a handle flange member extending radially outwardly from an outer surface of the cantilevered handle member.

In accordance with another feature, the handle flange member is of a shape corresponding to the shape of the least one recessed channel.

In accordance with a further feature of the present improvement, the handle bracket further comprises two opposing recessed channels defined by the inner surface of the handle bracket and spanning in a direction along the bracket length and from the upper end of the handle bracket toward the lower end of the handle bracket, the two opposing recessed channels shaped and sized to receive two handle flange members extending radially outwardly from an outer surface of the cantilevered handle member and in opposing directions.

In accordance with yet another feature, the handle bracket may comprise a plurality of throughholes shaped and sized to receive the first and second pins and with two of the plurality of throughholes having the first and second pins, respectively, disposed therein.

With the foregoing and other objects in view, there is also provided, a bicycle training aid comprising a cantilevered handle member with a first free end, a second end opposing the first free end, and handle member length separating the first free end and the second end, the cantilevered handle member terminating at the first free end and defining a plurality of throughholes; two clamping members, each with an upper clamping member and a lower clamping member defining a retention channel, the upper and lower clamping members operably configured to selectively compress and expand with respect to one another to decrease and increase a diameter of the retention channel, respectively; a first pin with head portion and a cantilevered and elongated pin portion extending from the head portion of the first pin and spanning through one of the plurality of throughholes defined by the cantilevered handle member, the cantilevered and elongated pin portion of the first pin having a locking aperture defined thereon and with a locking pin disposed within the locking aperture and one of the two clamping members rotatably coupled to the head portion of the first pin; and a second pin with head portion and a cantilevered and elongated pin portion extending from the head portion of the second pin and spanning through another of the plurality of throughholes defined by the cantilevered handle member, the cantilevered and elongated pin portion of the second pin having a locking aperture defined thereon and with a locking pin disposed within the locking aperture and another of the two clamping members rotatably coupled the head portion of the second pin.

Although the invention is illustrated and described herein as embodied in a bicycle training aid, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the cantilevered handle member.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
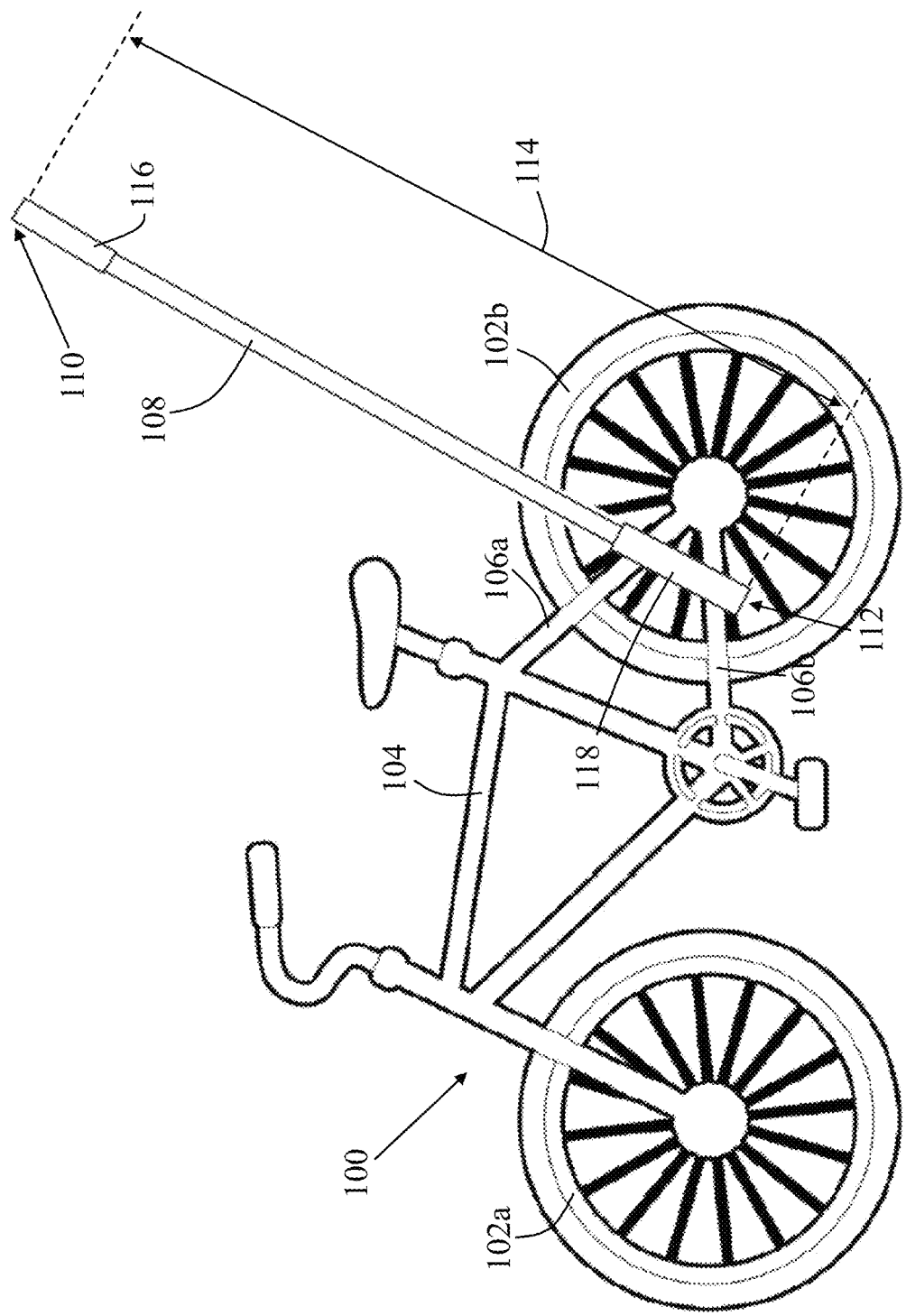
FIG. 1 is an elevational side view of an exemplary bicycle training aid in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present improvement provides a novel and efficient way of aiding users in learning how to ride a bicycle. The improvement is used in combination with a bicycle 100 having a front wheel 102a and a rear wheel 102b both rotatably coupled to a frame assembly 104 with two frame members 106a-b disposed proximal to one of the at least two wheels 102a-b. The bicycle training aid accommodates bicycles 100 of different shapes and sizes, as well as bicycles 100 which have frame members 106a-b of varying widths, lengths, and forms.

Embodiments of the invention provide a cantilevered handle member 108 which selectively couples to the bicycle and adjusts in height and angle to accommodate the operator of the cantilevered handle member.

Referring now to FIG. 1, one embodiment of the present invention is shown in a side elevational view. FIG. 1 shows several advantageous features of the present invention, but, as will be described below, the invention can be provided in several shapes, sizes, combinations of features and components, and varying numbers and functions of the components. The first example of a bicycle training aid device, as shown in FIG. 1, includes the cantilevered handle member 108 with a first free end 110, a second end 112 opposing the first free end 110, and handle member length 114 (e.g., approximately 3-6 feet) separating the first free end 110 and the second end 112, the cantilevered handle member 108 disposed laterally adjacent to and extending in a direction outwardly away from the rear wheel 102b, terminating at the first free end 110 disposed above the rear wheel 102b, and defining a plurality of throughholes (e.g., numeral 516). Preferably, the free end 110 can be seen disposed approximately 2-4 feet away from a top portion of the rear tire, thereby allowing easy and effective access to the member 108 for control and/or balancing of the bicycle.

It should be understood that terms such as, "front," "rear," "side," "top," "bottom," and the like are indicated from the reference point of a viewer viewing the bicycle training aid from the side of the bicycle 100 (see FIG. 1).

Figure 4:
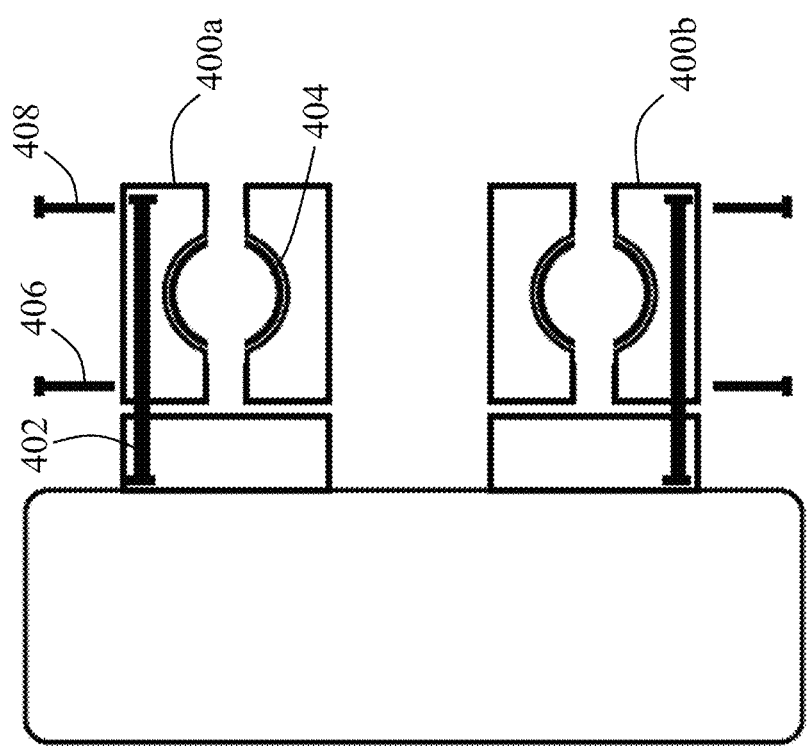
FIG. 4 is a perspective side view of a handle bracket member and two clamping members in accordance with one embodiment of the present invention.
Figure 5:
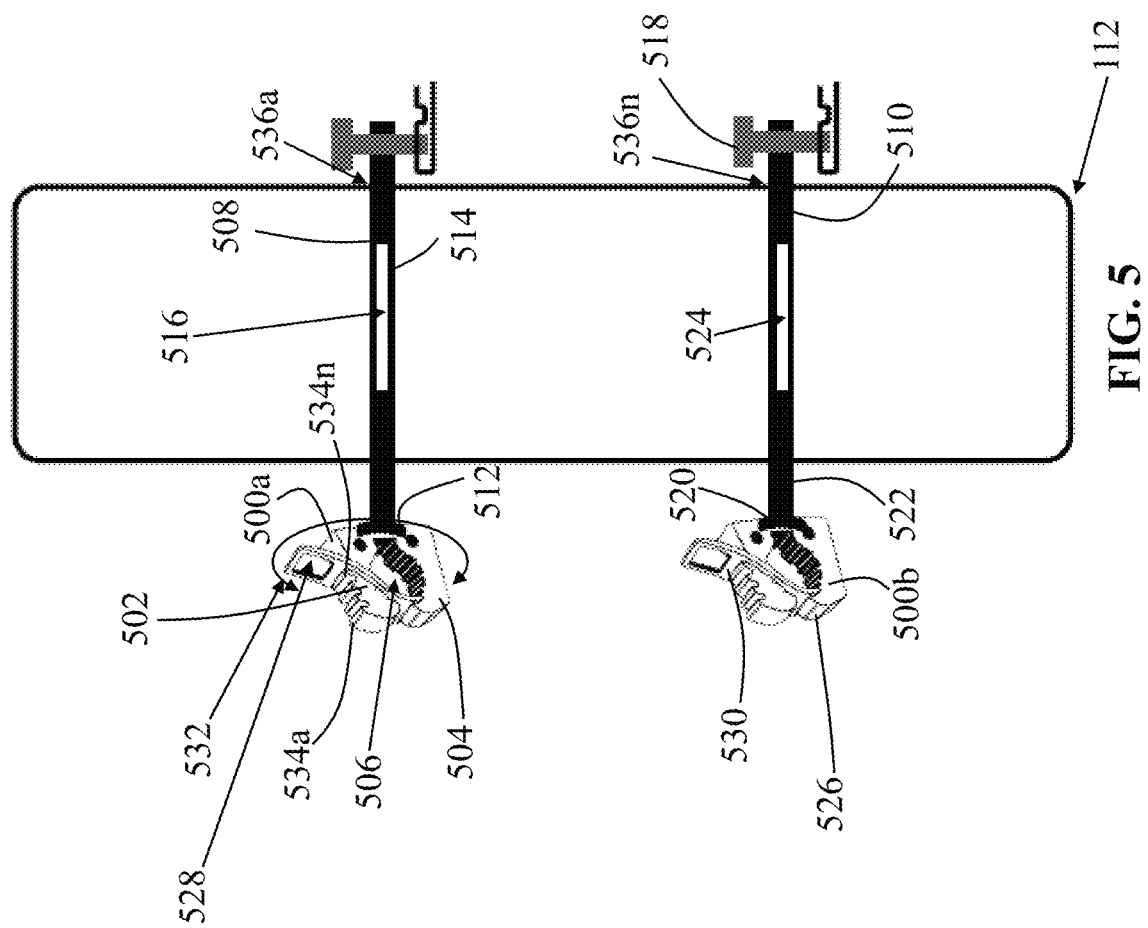
FIG. 5 is second perspective side view of a handle bracket member and two clamping members in accordance with one embodiment of the present invention.

As best seen in FIG. 4 and FIG. 5, the second end 112 further comprises two clamping members 400a-b, 500a-b, each with an upper clamping member 502 and a lower clamping member 504 defining a retention channel 506 with at least one of the two frame members 106a-b disposed therein, the upper and lower clamping members 502, 504 operably configured to selectively compress and expand with respect to one another to decrease and increase a diameter of the retention channel 506, respectively. This feature enables the two clamping members 500a-b to clamp onto frame members 106a-b of various widths and sizes. When the bicycle training aid is in use, the retention channel 506 is occupied by the frame member 106a-b through which the frame member 106a-b sits and/or is otherwise housed/retained. Unlike known bicycle training aids, the present invention is specially designed for attachment to at least two frame members 106a-b adjacent to the tire 102b (as seen in FIG. 1). As seen in FIG. 4, the clamping members 400a-b may include or may be composed of a polymeric dampening or retention material 404. Additionally, the clamping members 400a-b may be selectively opened and closed utilizing one or more upper fastener(s) 406, 408.

In alternate embodiments, the two clamping members 500a-b each further comprise a unitary body 526 with the upper and lower clamping members 502, 504 defining the U-shaped retention channel 506 and an entrance opening 528 spatially coupled to the U-shaped retention channel 506, the unitary body 526 having a strap 530 with a free end 532 operably configured to directly couple with at least one of the upper and lower clamping members 502, 504 and cause selective compression and expansion of the upper and lower clamping members 502, 504 with respect to one another.

The upper clamping member 502, lower clamping member 504, or both clamping members 502, 504 may further comprise a plurality of teeth 534a-n disposed on an upper surface, opposing an inner surface on the clamping members 502, 504 partially defining the retention channel 506, of the clamping members 502, 504 the plurality of teeth 534a-n defining a plurality of slots shaped and sized to receive a portion of the strap 530.

As further seen in FIG. 5, the second end 112 further comprises a first pin 508 and a second pin 510. Each pin 508, 510 comprises a head portion 512 and a cantilevered and elongated pin portion 514 extending from the head portion 512, 520 of the pin 508, 510 and spanning through one of the plurality of throughholes, e.g., through holes 536a-n (wherein "n" represents any number greater than one), defined by the cantilevered handle member 108, the cantilevered and elongated pin portion 514 of the pin 508, 510 having a locking aperture 516, 524 defined thereon and with a locking pin (e.g., locking pin 518) disposed within the locking aperture 516, 524 and each of the two clamping members 500a-b rotatably coupled to the head portion 512, 520 of each pin 508, 510. As best seen in FIG. 5, the plurality of throughholes 536a-n are disposed along the handle member length and are preferably proximal to the second end 112.

In one embodiment of the present improvement, and as seen in FIG. 5, the locking pin 518 is configured to lock into position through insertion into a locking clip 538 of a substantially planar shape and configured perpendicular to the locking pin 518.

In a preferred embodiment of the present improvement, the head portion 512, 520 of a substantially planar shape, is configured perpendicular to the cantilevered and elongated pin portion 514.

One embodiment of the bicycle training aid comprises the locking aperture 516, 524 as a throughole. An alternate embodiment of the present improvement comprises the locking aperture 516, 524 as an enclosed slotted channel, having a closed and defined end.

In alternate embodiments of the present improvement, the cantilevered handle member 108 further comprises a gripping member 116 disposed proximal to the first free end 110 and of an elastically resilient material. "Proximal" is defined as located at or near the first free end 110, within approximately 15-20% of the handle member length 114. The elastically resilient material encircling the gripping member 116 may be of a variety of materials including natural rubber and vinyl. This elastically resilient material aids operators of the bicycle training aid in maintaining their grip on the cantilevered handle member 108 as the bicycle 100 is in motion and in use.

Figure 2:
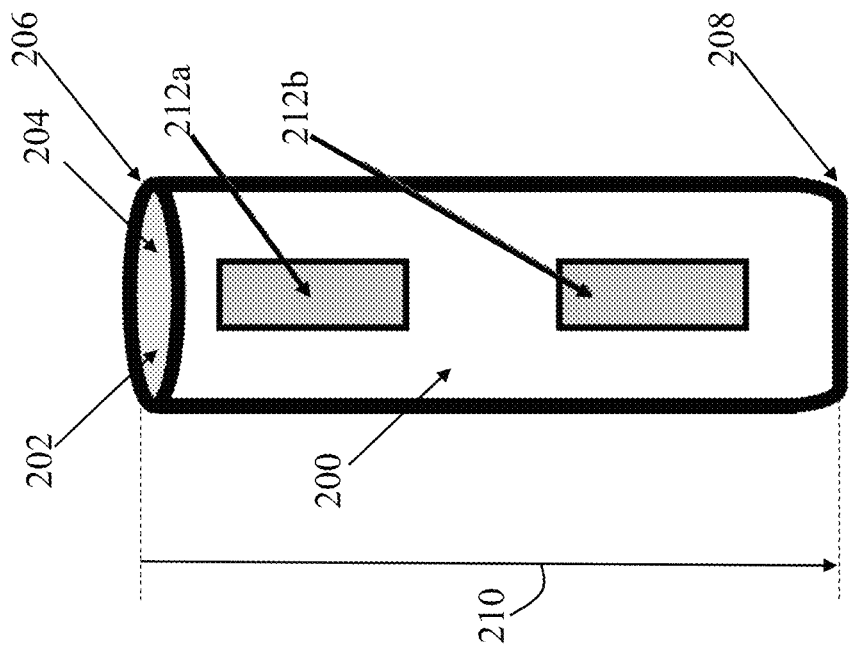
FIG. 2 is an elevational front view of a handle bracket member in accordance with one embodiment of the present invention.

As best seen in FIG. 2, an exemplary embodiment of the present improvement comprises a handle bracket 118 with an upper end 206, a lower end 208 opposing the upper end 206 of the handle bracket 118, a bracket length 210 separating the upper and lower ends 206, 208 of the handle bracket 118, an outer surface 200 coupled to the two clamping members 500a-b and with an inner surface 202 opposing the outer surface 200 and defining a handle placement channel 204 shaped and sized to receive the second end 112 of the cantilevered handle member 108 and a portion of the handle member length 114 spanning from the second end 112 and toward the first free end 110, the handle placement channel 204 with the cantilevered handle member 108 disposed therein. The handle bracket 118 may be operably configured to allow complete extraction and re-insertion of the cantilevered handle member 108 from within the handle placement channel 204. In the alternative, the handle bracket 118 may be operably configured to allow the cantilevered handle member 108 to extend upward away from the second end 112 and compress inward toward the second end 112, without allowing complete removal of the cantilevered handle member 108 from the handle placement channel 204. The handle bracket 118 may also include a set of slots 212a-b that may be enclosed and provide a user access to the fastener(s), e.g., fastener 402, thereby enabling selective disengagement or engagement of the clamping members 400a-b. An effective recess and structural configuration of the cantilevered handle member 108 and the handle bracket 118 can also be seen in FIGS. 6-7.

The cantilevered handle member 108, the handle bracket 118, and fasteners described herein should be preferably of a substantially rigid material, e.g., stainless steel or PVC, sufficient to withstand approximately 10-20 lbf torque applied to the free end 110 of the handle member 108 when coupled to the bike frame without plastic deformation. Additionally, the cantilevered handle member 108, the handle bracket 118, and fasteners should be of a waterproof material, e.g., stainless steel or PVC.

Figure 3:
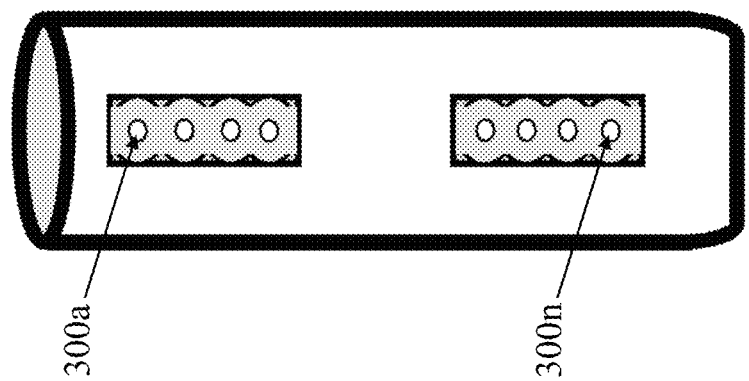
FIG. 3 is an elevational rear view of the handle bracket member in FIG. 2 in accordance with one embodiment of the present invention.

FIG. 3 depicts an alternate view of the handle bracket 118 wherein the handle bracket 118 may further comprise a plurality of throughholes 300a-n shaped and sized to receive the first and second pins 508, 510 and with two of the plurality of throughholes 300a-n having the first and second pins 508, 510, respectively, disposed therein. Beneficially, the plurality of throughholes 300a-n may be serially and vertically aligned to enable movement of the clamping members, thereby accommodating frame members of varying separation to one another.

The handle bracket 118 may further comprise at least one recessed channel 600 defined by the inner surface 202 of the handle bracket 118 and spanning in a direction along the bracket length 210 and from the upper end 206 of the handle bracket 118 toward the lower end 208 of the handle bracket 118, the at least one recessed channel 600 shaped and sized to receive a handle flange member 700 extending radially outwardly from an outer surface 702 of the cantilevered handle member 108.

Figure 7:
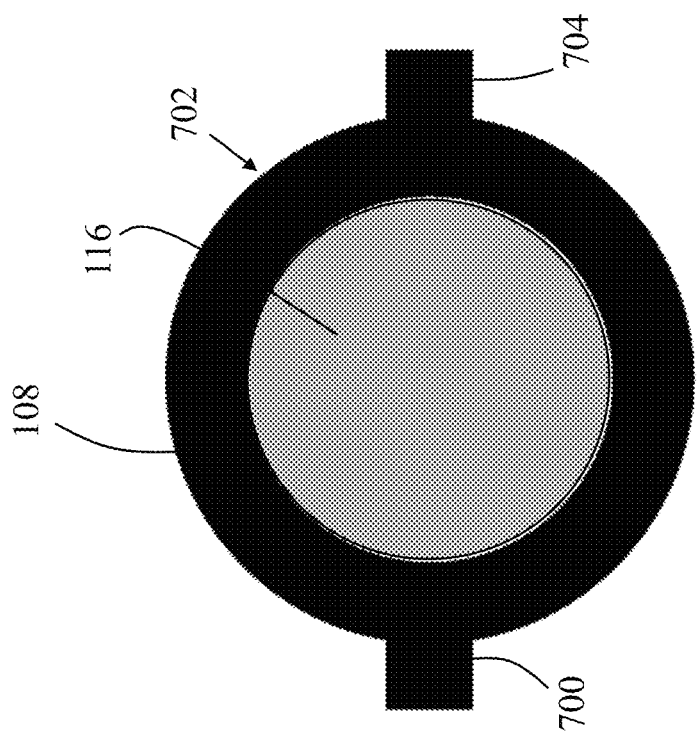
FIG. 7 is a top plan view of the cantilevered handle member in accordance with an exemplary embodiment of the present invention.
Figure 6:
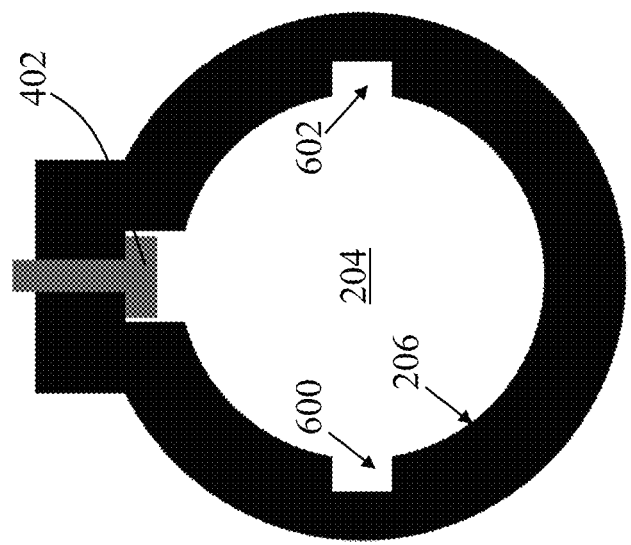
FIG. 6 is a top plan view of the handle bracket member in accordance with one embodiment of the present invention.

As depicted in FIG. 6 and FIG. 7, the handle flange member 700 is of a shape corresponding to the shape of the least one recessed channel 600. "Corresponding" is defined as substantially the same shape and, preferably in most embodiments, of substantially the same size to provide a complimentary and snug fit between them. This corresponding configuration between the handle flange member 700 and the at least one recessed channel 600 facilitates a smooth and solid movement when extending and compressing the cantilevered handle member 108 in the handle placement channel 204.

In alternate embodiments, the handle bracket 118 may comprise two or more opposing recessed channels 600, 602 defined by the inner surface 202 of the handle bracket 118 and spanning in a direction along the bracket length 210 and from the upper end 206 of the handle bracket 118 toward the lower end 208 of the handle bracket 118, the two or more opposing recessed channels 600, 602 shaped and sized to receive two or more handle flange members 700, 704 extending radially outwardly from an outer surface 702 of the cantilevered handle member 108 and in opposing directions.

The present invention also claims a bicycle training aid device comprising a cantilevered handle member 108 with a first free end 110, a second end 112 opposing the first free end 110, and handle member length 114 separating the first free end 110 and the second end 112, the cantilevered handle member 108 terminating at the first free end 110 and defining a plurality of throughholes 516; two clamping members 400a-b, 500a-b, each with an upper clamping member 502 and a lower clamping member 504 defining a retention channel 506, the upper and lower clamping members 502, 504 operably configured to selectively compress and expand with respect to one another to decrease and increase a diameter of the retention channel 506, respectively; a first pin 508 with head portion 512 and a cantilevered and elongated pin portion 514 extending from the head portion 512 of the first pin 508 and spanning through one of the plurality of through holes 536a-n defined by the cantilevered handle member 108, the cantilevered and elongated pin portion 514 of the first pin 508 having a locking aperture 516 defined thereon and with a locking pin 518 disposed within the locking aperture 516 and one of the two clamping members 500a-b rotatably coupled to the head portion 512 of the first pin 508; and a second pin 510 with head portion 520 and a cantilevered and elongated pin portion 514 extending from the head portion 520 of the second pin 510 and spanning through another of the plurality of through holes 536a-n defined by the cantilevered handle member 108, the cantilevered and elongated pin portion 514 of the second pin 510 having a locking aperture 524 defined thereon and with a locking pin 518 disposed within the locking aperture 524 and another of the two clamping members 500a-b rotatably coupled to the head portion 520 of the second pin 510.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above described features.

What is claimed is:

1. In combination with a bicycle having a front wheel and a rear wheel both rotatably coupled to a frame assembly with two frame members disposed proximal to one of the at least two wheels, the improvement comprising:
 a cantilevered handle member with a first free end, a second end opposing the first free end, and handle member length separating the first free end and the second end, the cantilevered handle member disposed laterally adjacent to and extending in a direction outwardly away from the rear wheel, terminating at the first free end disposed above the rear wheel, and defining a plurality of throughholes;

two clamping members, each with a unitary body with an upper clamping member and a lower clamping member defining a U-shaped retention channel with at least one of the two frame members disposed therein and an entrance opening spatially coupled to the U-shaped retention channel, the upper and lower clamping members operably configured to selectively compress and expand with respect to one another to decrease and increase a diameter of the retention channel, respectively and the unitary body having a strap with a free end operably configured to directly couple with at least one of the upper and lower clamping members and cause selective compression and expansion of the upper and lower clamping members with respect to one another;

a first pin with head portion and a cantilevered and elongated pin portion extending from the head portion of the first pin and spanning through one of the plurality of throughholes defined by the cantilevered handle member, the cantilevered and elongated pin portion of the first pin having a locking aperture defined thereon and with a locking pin disposed within the locking aperture and one of the two clamping members rotatably coupled to the head portion of the first pin; and a second pin with head portion and a cantilevered and elongated pin portion extending from the head portion of the second pin and spanning through another of the plurality of throughholes defined by the cantilevered handle member, the cantilevered and elongated pin portion of the second pin having a locking aperture defined thereon and with a locking pin disposed within the locking aperture and another of the two clamping members rotatably coupled to the head portion of the second pin.

2. The improvement according to claim 1, wherein the cantilevered handle member further comprises:
a gripping member disposed proximal to the first free end and of an elastically resilient material.

3. The improvement according to claim 1, wherein:
the locking apertures defined by the first and second pins, respectively, are of an enclosed slotted channel.

4. The improvement according to claim 1, wherein the upper clamping member further comprises:
a plurality of teeth disposed on an upper surface, opposing an inner surface on the upper clamping member partially defining the retention channel, of the upper clamping member, the plurality of teeth defining a plurality of slots shaped and sized to receive a portion of the strap.

5. The improvement according to claim 1, further comprising:
a handle bracket with an upper end, a lower end opposing the upper end of the handle bracket, a bracket length separating the upper and lower ends of the handle bracket, an outer surface coupled to the two clamping members and with an inner surface opposing the outer surface and defining a handle placement channel shaped and sized to receive the second end of the cantilevered handle member and a portion of the handle member length spanning from the second end and toward the first free end, the handle placement channel with the cantilevered handle member disposed therein.

6. The improvement according to claim 5, wherein the handle bracket further comprises:

at least one recessed channel defined by the inner surface of the handle bracket and spanning in a direction along the bracket length and from the upper end of the handle bracket toward the lower end of the handle bracket, the at least one recessed channel shaped and sized to receive a handle flange member extending radially outwardly from an outer surface of the cantilevered handle member.

7. The improvement according to claim 6, wherein:
the handle flange member is of a shape corresponding to the shape of the least one recessed channel.

8. The improvement according to claim 7, wherein the handle bracket further comprises:
two opposing recessed channels defined by the inner surface of the handle bracket and spanning in a direction along the bracket length and from the upper end of the handle bracket toward the lower end of the handle bracket, the two opposing recessed channels shaped and sized to receive two handle flange members extending radially outwardly from an outer surface of the cantilevered handle member and in opposing directions.

9. The improvement according to claim 8, wherein the handle bracket further comprises:
a plurality of throughholes shaped and sized to receive the first and second pins and with two of the plurality of throughholes having the first and second pins, respectively, disposed therein.

10. A bicycle training aid comprising:
a cantilevered handle member with a first free end, a second end opposing the first free end, a handle member length separating the first free end and the second end, and defining a plurality of throughholes along the handle member length and proximal to the second end;

two clamping members, each with an upper clamping member and a lower clamping member defining a U-shaped retention channel and an entrance opening spatially coupled to the U-shaped retention channel, the upper and lower clamping members operably configured to selectively compress and expand with respect to one another to decrease and increase a diameter of the retention channel, respectively and the unitary body having a strap with a free end operably configured to directly couple with at least one of the upper and lower clamping members and cause selective compression and expansion of the upper and lower clamping members with respect to one another;

a first pin with head portion and a cantilevered and elongated pin portion extending from the head portion of the first pin and shaped and sized to insert through one of the plurality of throughholes defined by the cantilevered handle member, the cantilevered and elongated pin portion of the first pin having a locking aperture defined thereon and operably configured to receive a locking pin through the locking aperture and one of the two clamping members rotatably coupled to, and operably configured to rotate 360° about, the head portion of the first pin; and a second pin with head portion and a cantilevered and elongated pin portion extending from the head portion of the second pin and shaped and sized to insert through another of the plurality of throughholes defined by the cantilevered handle member, the cantilevered and elongated pin portion of the second pin having a locking aperture defined thereon and operably configured to receive a locking pin through the locking aperture and another of the two clamping members rotatably coupled to, and operably configured to rotate 360° about, the head portion of the second pin.

11. The bicycle training aid according to claim 10, wherein the cantilevered handle member further comprises:
a gripping member disposed proximal to the first free end and of an elastically resilient material.

12. The bicycle training aid according to claim 10, wherein:
the locking apertures defined by the first and second pins, respectively, are of an enclosed slotted channel.

13. The bicycle training aid according to claim 10, wherein the upper clamping member further comprises:
a plurality of teeth disposed on an upper surface, opposing an inner surface on the upper clamping member partially defining the retention channel, of the upper clamping member, the plurality of teeth defining a plurality of slots shaped and sized to receive a portion of the strap.

14. The bicycle training aid according to claim 10, further comprising:
a handle bracket with an upper end, a lower end opposing the upper end of the handle bracket, a bracket length separating the upper and lower ends of the handle bracket, an outer surface coupled to the two clamping members and with an inner surface opposing the outer surface and defining a handle placement channel shaped and sized to receive the second end of the cantilevered handle member and a portion of the handle member length spanning from the second end and toward the first free end.

15. The bicycle training aid according to claim 10, wherein the handle bracket further comprises:
at least one recessed channel defined by the inner surface of the handle bracket and spanning in a direction along the bracket length and from the upper end of the handle bracket toward the lower end of the handle bracket, the at least one recessed channel shaped and sized to receive a handle flange member extending radially outwardly from an outer surface of the cantilevered handle member.

16. A bicycle training aid comprising:
a cantilevered handle member with a first free end, a second end opposing the first free end, a handle member length separating the first free end and the second end, and defining a plurality of throughholes along the handle member length and proximal to the second end;
two clamping members, each with an upper clamping member and a lower clamping member each having a surface defining a U-shaped retention channel, the upper and lower clamping members operably configured to selectively compress and expand with respect to one another to decrease and increase a diameter separating the surfaces defining the U-shaped retention channels of the upper and lower clamping members, respectively, the upper and lower clamping members coupled together with at least one fastener operably configured to cause selective compression and expansion of the upper and lower clamping members with respect to one another;
a first pin with head portion and a cantilevered and elongated pin portion extending from the head portion of the first pin and shaped and sized to insert through one of the plurality of throughholes and directly couple with either the upper clamping member or lower clamping member; and
a second pin with head portion and a cantilevered and elongated pin portion extending from the head portion of the first pin and shaped and sized to insert through one of the plurality of throughholes and directly couple with either the upper clamping member or lower clamping member.

17. The bicycle training aid according to claim 16, wherein the first and second pin further comprising:
a locking aperture defined on the cantilevered and elongated pin portion thereof that is operably configured to receive a locking pin therethrough.

18. The bicycle training aid according to claim 16, wherein:
the upper and lower clamping members rotatably coupled to, and operably configured to rotate 360° about, the head portion of the first or second pin respectively coupled thereto.

19. The bicycle training aid according to claim 16, wherein:
the plurality of throughholes are serially and vertically aligned to enable movement of at least one of the upper and lower clamping members.

20. The bicycle training aid according to claim 16, further comprising:
a handle bracket with an upper end, a lower end opposing the upper end of the handle bracket, a bracket length separating the upper and lower ends of the handle bracket, an outer surface coupled to the two clamping members and with an inner surface opposing the outer surface and defining a handle placement channel shaped and sized to receive the second end of the cantilevered handle member and a portion of the handle member length spanning from the second end and toward the first free end, the handle placement channel with the cantilevered handle member disposed therein.

* * * * *